(12) United States Patent
Hiwaki

(10) Patent No.: US 12,527,488 B2
(45) Date of Patent: Jan. 20, 2026

(54) BRAIN FUNCTION MEASUREMENT DEVICE AND BRAIN FUNCTION MEASUREMENT METHOD

(71) Applicant: Hiroshima City University, Hiroshima (JP)

(72) Inventor: Osamu Hiwaki, Hiroshima (JP)

(73) Assignee: Hiroshima City University, Hiroshima (JP)

( * ) Notice: Subject to any disclaimer, the term of this patent is extended or adjusted under 35 U.S.C. 154(b) by 666 days.

(21) Appl. No.: 17/294,354

(22) PCT Filed: Nov. 14, 2019

(86) PCT No.: PCT/JP2019/044712
§ 371 (c)(1),
(2) Date: May 14, 2021

(87) PCT Pub. No.: WO2020/100983
PCT Pub. Date: May 22, 2020

(65) Prior Publication Data
US 2022/0000383 A1    Jan. 6, 2022

(30) Foreign Application Priority Data
Nov. 15, 2018    (JP) .................................. 2018-214249

(51) Int. Cl.
*A61B 5/05*  (2021.01)
*A61B 5/00*  (2006.01)

(52) U.S. Cl.
CPC .............. *A61B 5/05* (2013.01); *A61B 5/4064* (2013.01); *A61B 5/6814* (2013.01); *A61B 2562/0223* (2013.01)

(58) Field of Classification Search
CPC .......... A61B 5/6868; A61B 2562/0223; A61B 5/6814; A61B 5/4064; A61B 5/05
See application file for complete search history.

(56) References Cited

U.S. PATENT DOCUMENTS

| | | | |
|---|---|---|---|
| 4,901,238 A | 2/1990 | Suzuki et al. | |
| 6,256,531 B1 * | 7/2001 | Ilmoniemi | A61N 2/02 600/544 |

(Continued)

FOREIGN PATENT DOCUMENTS

| | | | |
|---|---|---|---|
| JP | S57-115232 A | 7/1982 | |
| JP | S63-275323 A | 11/1988 | |

(Continued)

OTHER PUBLICATIONS

Hyperphysics, magnets, http://hyperphysics.phy-astr.gsu.edu/hbase/magnetic/elemag.html, wayback machine dated Mar. 5, 2000 (Year: 2000).*

(Continued)

*Primary Examiner* — John D Li
(74) *Attorney, Agent, or Firm* — RANKIN, HILL & CLARK LLP (57) ABSTRACT

Magnetic field generating means (2) is disposed on a scalp (1) of a subject (P) and generates a magnetic field that is radiated from a north pole, passes through a cerebral cortex (3) of the subject (P) and returns to a south pole in a loop path. Magnetic field detecting means (5) is disposed on the scalp (1) and detects a change in the magnetic field (4) as a signal reflecting an activity status of the cerebral cortex (3).

17 Claims, 10 Drawing Sheets

(56) References Cited

U.S. PATENT DOCUMENTS

| | | | | |
|---|---|---|---|---|
| 2002/0107455 A1* | 8/2002 | Musha | .................... | A61B 5/374 |
| | | | | 600/546 |
| 2004/0104720 A1* | 6/2004 | Ramirez | ................ | G01D 5/145 |
| | | | | 324/207.2 |
| 2004/0144173 A1* | 7/2004 | Umeno | ................ | G01M 17/02 |
| | | | | 73/325 |
| 2005/0107655 A1* | 5/2005 | Holzner | ................ | A61N 2/006 |
| | | | | 600/9 |
| 2009/0083071 A1* | 3/2009 | Phillips | .................... | A61B 5/24 |
| | | | | 705/2 |
| 2011/0118589 A1* | 5/2011 | Negre | ...................... | A61B 5/06 |
| | | | | 340/384.1 |
| 2011/0163739 A1* | 7/2011 | Ono | ...................... | H10N 50/10 |
| | | | | 324/207.21 |
| 2015/0126829 A1* | 5/2015 | Bernstein | ................ | A61B 5/05 |
| | | | | 600/409 |
| 2015/0272461 A1* | 10/2015 | Morimoto | ............ | A61B 5/7246 |
| | | | | 600/410 |
| 2016/0193476 A1 | 7/2016 | Helekar et al. | | |
| 2017/0238834 A1* | 8/2017 | Kawabata | ............ | A61B 5/0515 |
| 2017/0266443 A1* | 9/2017 | Rajguru | ................. | A61B 5/388 |
| 2018/0220911 A1 | 8/2018 | Hiwaki | | |

FOREIGN PATENT DOCUMENTS

| | | |
|---|---|---|
| JP | 2010-082370 A | 4/2010 |
| JP | 2018-122019 A | 8/2018 |
| WO | 2020/100983 A1 | 5/2020 |

OTHER PUBLICATIONS

International Search Report and Written Opinion, dated Feb. 4, 2020, for International Patent Application Serial No. PCT/JP2019/044712 filed on Nov. 14, 2019.

* cited by examiner

BRAIN FUNCTION MEASUREMENT DEVICE AND BRAIN FUNCTION MEASUREMENT METHOD

CROSS REFERENCE TO RELATED APPLICATIONS

This application is a national phase filing of PCT/JP2019/044712, filed on Nov. 14, 2019, which claims priority to Japanese Patent Application No. 2018-214249, filed on Nov. 15, 2018, the entire disclosures of which are incorporated herein by reference.

TECHNICAL FIELD

The present disclosure relates to a brain function measurement apparatus and a brain function measurement method, the brain function measurement apparatus including: magnetic field generating means that generates a magnetic field which returns in a loop path from a north pole to a south pole, such as a magnet; and magnetic field detecting means that detects a change in the magnetic field.

BACKGROUND ART

In recent years, methods for non-invasively measuring a brain function have been proposed, such as the functional Near Infra-Red Spectroscopy (NIRS). This method measures an information transmission function of a nerve cell that converts information such as a visual sensation or an auditory sensation delivered from a sensory organ such as eyes or ears into an electric signal and transmits the information to a brain as a change in the amount of oxygenated hemoglobin flowing through capillaries in the brain using near-infrared light.

Patent Literature 1 and Patent Literature 2 disclose non-invasive brain function measurement apparatuses for measuring a brain activity in a cerebral cortex using the NIRS. The measurement apparatuses irradiate a brain with near-infrared light from a light source disposed on a scalp area of a subject (which may be abbreviated as "scalp" hereinafter), receive the reflected light and the scattered light generated by the irradiation with an optical receiver that is also disposed on the scalp to measure an activity status of a brain as a change in the blood flow through capillaries in the brain.

In addition, Patent Literature 3 discloses a non-invasive brain function measurement method by measuring near-infrared light passing through a brain. In the measurement method, a light source that generates near-infrared light is disposed in an oral cavity, near-infrared light is emitted in a direction from a bottom of a brain toward a scalp, and the transmitted light is received by an optical receiver disposed on the scalp to measure a brain activity as a change in the blood flow through capillaries in the brain. In this case, the near-infrared light passes through a region deep in the brain, which enables measurement of a brain function reflecting an activity inside the brain.

Furthermore, Patent Literature 4 discloses a non-invasive brain function measurement apparatus using a magnet or the like. In the measurement apparatus, a magnetic field source such as a magnet is disposed in an oral cavity, a magnetic field is generated in a direction from a bottom of a brain toward a scalp, and the transmitted magnetic field is received by a magnetic field sensor disposed on the scalp to measure a brain activity as a change in the magnetic field.

CITATION LIST

Patent Literature

Patent Literature 1: Unexamined Japanese Patent Application Publication No. S57-115232
Patent Literature 2: Unexamined Japanese Patent Application Publication No. S63-275323
Patent Literature 3: Unexamined Japanese Patent Application Publication No. 2010-082370
Patent Literature 4: Unexamined Japanese Patent Application Publication No. 2018-122019

SUMMARY OF INVENTION

Technical Problem

In the aforementioned measurement apparatuses disclosed in Patent Literature 1 and Patent Literature 2, since the light source that generates near-infrared light and the optical receiver for receiving the reflected light and the scattered light for the near-infrared light are disposed on the same scalp, the light source and the optical receiver need to be disposed apart from each other, for example, by a few centimeters. Consequently, a spatial resolution is low and only a brain activity in a region shallow in the brain may be measured; as a result, a brain function inside the brain may not be measured with high degree of accuracy. In addition, a change in absorbance of oxygenated hemoglobin and deoxygenated hemoglobin may be measured on the order of as high as a few seconds; therefore, a temporal resolution is also low.

In the brain function measurement apparatus disclosed in Patent Literature 3, since the light source that generates near-infrared light is disposed in the oral cavity, the light source needs to be supplied with power; consequently, for example, a lead wire and/or a signal line needs to be introduced into the oral cavity, or a battery needs to be located in the oral cavity. Therefore, the brain function measurement apparatus gives the subject an uncomfortable feeling and makes the measurement operation complicated. In addition, since the near-infrared light passes through the bottom of the brain, it is concerned that the near-infrared light may have a harmful effect on a sensory organ close to the bottom of the brain, for example, a retina of an eye. Furthermore, the optical receiver needs to be closely attached to the scalp, and measurement sensitivity is reduced when a hair or the like is stuck between the optical receiver and the scalp.

In the brain function measurement apparatus disclosed in Patent Literature 4, the magnetic field source such as a magnet is disposed in the oral cavity, a magnetic field is generated in the direction from the bottom of the brain toward the scalp, and the transmitted magnetic field is measured with the magnetic field sensor disposed on the scalp. In this manner, some of the problems of the brain function measurement apparatus disclosed in Patent Literature 3 are resolved. However, as is well known, since a static magnetic field returns in a loop path from a north pole to a south pole, a difference may be generated between an active site in the brain and a measurement point on the scalp, leading to a problem that determining a portion of a cerebral cortex adjacent to a straight line connecting the magnet and the magnetic field sensor as the active site may be difficult.

In view of the problems described above, it is an objective of the present disclosure to provide a brain function measurement apparatus and a brain function measurement method that can perform measurement with high degree of accuracy in which an active site in a brain can be accurately and easily determined. More specifically, it is an objective of the present disclosure to provide a brain function measurement apparatus and a brain function measurement method that can measure, by radiating a static magnetic field into the inside of a scalp from a magnet disposed on the scalp and utilizing a phenomenon that the static magnetic field returns in a loop path, an active site in the brain and an activity status of the brain by measuring, with a magnetic field sensor, a strength of the magnetic field that returns to the scalp via a cerebral cortex at an outermost part of the brain.

Solution to Problem

In order to achieve the objective described above, a brain function measurement apparatus according to a first aspect of the present disclosure includes:

magnetic field generating means that is disposed on a scalp of a subject and generates a magnetic field which is radiated from a north pole, passing through a cerebral cortex of the subject and returning to a south pole in a loop path; and magnetic field detecting means disposed on the scalp that detects a change in the magnetic field as a signal reflecting an activity status of the cerebral cortex.

The magnetic field generating means may be a permanent magnet such as a ferrite magnet, a samarium-cobalt magnet, an alnico magnet, or a neodymium magnet, or an electromagnet.

The magnetic field detecting means may be one of a uniaxial magnetic field sensor, a biaxial magnetic field sensor, and a triaxial magnetic field sensor.

The brain function measurement apparatus may further include a magnetic shielding container that accommodates the magnetic field generating means and the magnetic field detecting means and shields an external magnetic field entering from an area other than a portion facing the scalp.

In other words, the magnetic field generating means and the magnetic field detecting means may be mounted inside the magnetic shielding container as a set of measurement devices (which may be abbreviated as "sensing terminal" hereinafter) in order to prevent interference with other magnetic field generating means or a magnetic field present in a measurement environment such as the geomagnetic field. The sensing terminal corresponds to the measurement point.

The brain function measurement apparatus may include a rotatable member to which the magnetic field generating means and the magnetic field detecting means are attached, the rotatable member being rotatable about the center of a line connecting the magnetic field generating means and the magnetic field detecting means in conjunction with a rotation of a shaft perpendicular to the scalp.

The magnetic field generating means may include a structure that enables a polarity of a pole facing the scalp to be switchable between a north pole and a south pole.

A brain function measurement method according to a second aspect of the present disclosure for achieving the objective is a brain function measurement method for non-invasively measuring a brain function, including:

radiating a magnetic field toward a cerebral cortex at an outermost part of a brain of a subject using magnetic field generating means disposed on a scalp of the subject; and detecting, by utilizing a phenomenon that a static magnetic field generated by the magnetic field generating means is radiated from a north pole, passes through the cerebral cortex and returns to a south pole in a loop path, the magnetic field that returns as a signal reflecting an activity status of the cerebral cortex with magnetic field detecting means disposed on the scalp.

As the magnetic field generating means, a permanent magnet such as a ferrite magnet, a samarium-cobalt magnet, an alnico magnet, or a neodymium magnet, or an electromagnet may be used.

As the magnetic field detecting means, one of a uniaxial magnetic field sensor, a biaxial magnetic field sensor, and a triaxial magnetic field sensor may be used.

A magnetic shielding container that accommodates the magnetic field generating means and the magnetic field detecting means may be used to shield an external magnetic field entering from an area other than a portion facing the scalp.

In other words, the magnetic field generating means and the magnetic field detecting means may be used as a set of measurement devices (which may be abbreviated as "sensing terminal" hereinafter) and mounted inside the magnetic shielding container in order to prevent interference with other magnetic field generating means or a magnetic field present in a measurement environment such as the geomagnetic field.

The magnetic field may be generated by the magnetic field generating means and detected by the magnetic field detecting means while changing a relationship between a direction toward which the magnetic field is radiated and a direction of a nerve fiber in the cerebral cortex by rotating a rotatable member to which the magnetic field generating means and the magnetic field detecting means are attached and that includes a shaft perpendicular to the scalp about the center of the line connecting the magnetic field generating means and the magnetic field detecting means.

The direction of the magnetic field radiated toward the cerebral cortex may be changed by switching, in the magnetic field generating means, a polarity of a pole facing the scalp between the north pole and the south pole to detect the magnetic field with the magnetic field detecting means.

Advantageous Effects of Invention

The brain function measurement apparatus and the brain function measurement method according to the present disclosure can non-invasively measure an active state of a nerve cell in the cerebral cortex with an apparatus having a relatively simple configuration, and by using a signal deriving from a magnetic field, measurement is not affected even if a hair or the like is stuck between the sensing terminal and the scalp and may be performed with high degree of accuracy. In addition, configuring the sensing terminal to be rotatable enables a direction of the radiated magnetic field to be variable by attaching the sensing terminal just once, and information about the direction of the nerve fiber in the cerebral cortex may be recognized with a simple procedure.

DESCRIPTION OF EMBODIMENTS

The present disclosure discloses a brain function measurement apparatus and a brain function measurement method for measuring an active state of a brain using a magnetic field. The present disclosure has following superiority over the Electro-EncephaloGraphy (EEG) in obtaining a solution to an inverse problem of estimating which site is activated in a brain of a subject on the basis of a result of measurement performed at a plurality of positions on a scalp of the subject.

1. Since magnetic permeability of a head is substantially uniform, measurement may be performed with high degree of accuracy compared to the EEG, which is susceptible to an effect of different dielectric constants of substances (such as cerebrospinal fluid, dura mater, or bones, which may be abbreviated as "intervening substance") that exist between nerve cells and the scalp).
2. The effect of the aforementioned intervening substances in obtaining the solution to the inverse problem need not be considered, thus enabling an algorithm to be simplified.

The embodiments of the present disclosure will be described in detail below with reference to the drawings. In the figures, components having the same function are denoted by the same number, and description thereof may be omitted.

Figure 1:
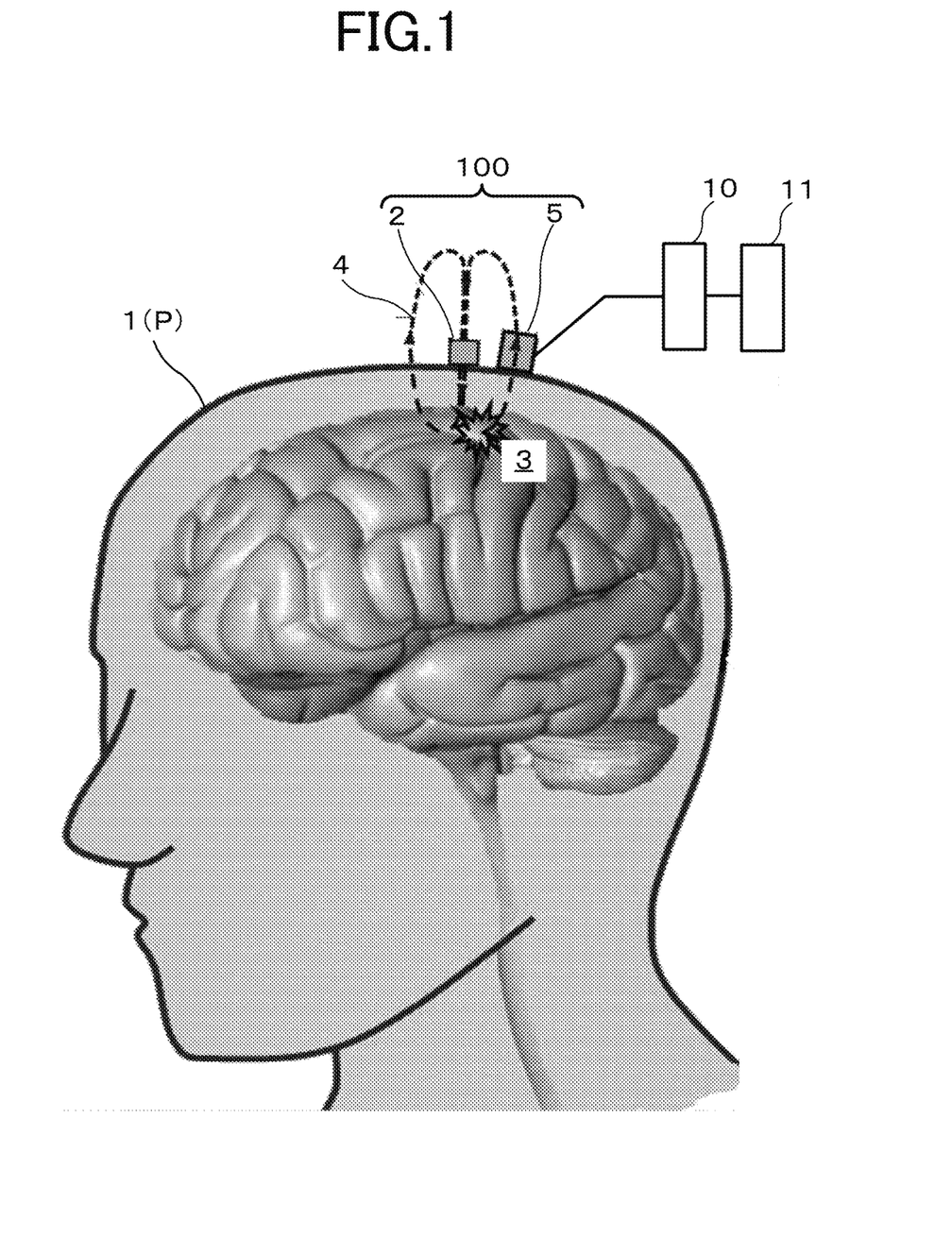
FIG. 1 is a schematic diagram illustrating a configuration of a brain function measurement apparatus according to the present disclosure.

FIG. 1 illustrates a configuration of a brain function measurement apparatus 100 according to the present embodiment. As illustrated in FIG. 1, the brain function measurement apparatus 100 includes magnetic field generating means 2 and magnetic field detecting means 5.

The magnetic field generating means 2 is disposed on a scalp 1 of a subject P. The magnetic field generating means 2 irradiates a cerebral cortex 3 that is a target for measuring an activity status of a brain of the subject P with a magnetic field (static magnetic field) 4. The magnetic field 4 is radiated from the north pole, passes through the cerebral cortex 3 of the subject P, and returns to the south pole in a loop path. In the present embodiment, a direction of viewing the north pole from the south pole at the magnetic field generating means 2 is defined as an irradiation direction of the magnetic field. The magnetic field generating means 2 is a permanent magnet although it may be an electromagnet. When a permanent magnet is used, a ferrite magnet, a samarium-cobalt magnet, an alnico magnet, or a neodymium magnet may be employed. When an electromagnet is used, a magnet coil may be employed.

The magnetic field detecting means 5 detects a change in the magnetic field 4 that returns to the scalp 1 after the magnetic field 4 is affected by an interaction with a brain activity. On the basis of a result of the detection by the magnetic field detecting means 5, an active state of the cerebral cortex 3 is measured. The magnetic field detecting means 5 may be a uniaxial magnetic field sensor that detects a magnetic field in a single direction, a biaxial magnetic field sensor that detects a magnetic field in two orthogonal directions, or a triaxial magnetic field sensor that detects a magnetic field in three orthogonal directions.

A signal measured with the magnetic field detecting means 5 that indicates the active state of the cerebral cortex 3 is converted into time-series digital signal data by an analog/digital converter 10. The converted digital signal data are stored in a device 11 including a personal computer and the like. Signal processing and calculations are performed on the digital signal data stored in the device 11 as necessary.

FIG. 1 only illustrates a set of the magnetic field generating means 2 and the magnetic field detecting means 5 and measurement statuses thereof. However, when plural sets of the magnetic field generating means 2 and the magnetic field detecting means 5 are disposed as necessary at measurement points for individual sets on the scalp 1 of the subject P, an activity status of the cerebral cortex 3 at each of the measurement points may be measured.

As illustrated in FIG. 2, FIG. 3A, FIG. 3B, and FIG. 4A, the brain function measurement apparatus 100 further includes a magnetic shielding container 6 and a mounting plate 7. The magnetic shielding container 6 is a hollow cylindrical container and a bottom face 6a thereof is disposed so as to face the scalp 1. The mounting plate 7 is disposed on the scalp 1 and supports the magnetic shielding container 6.

Figure 2:
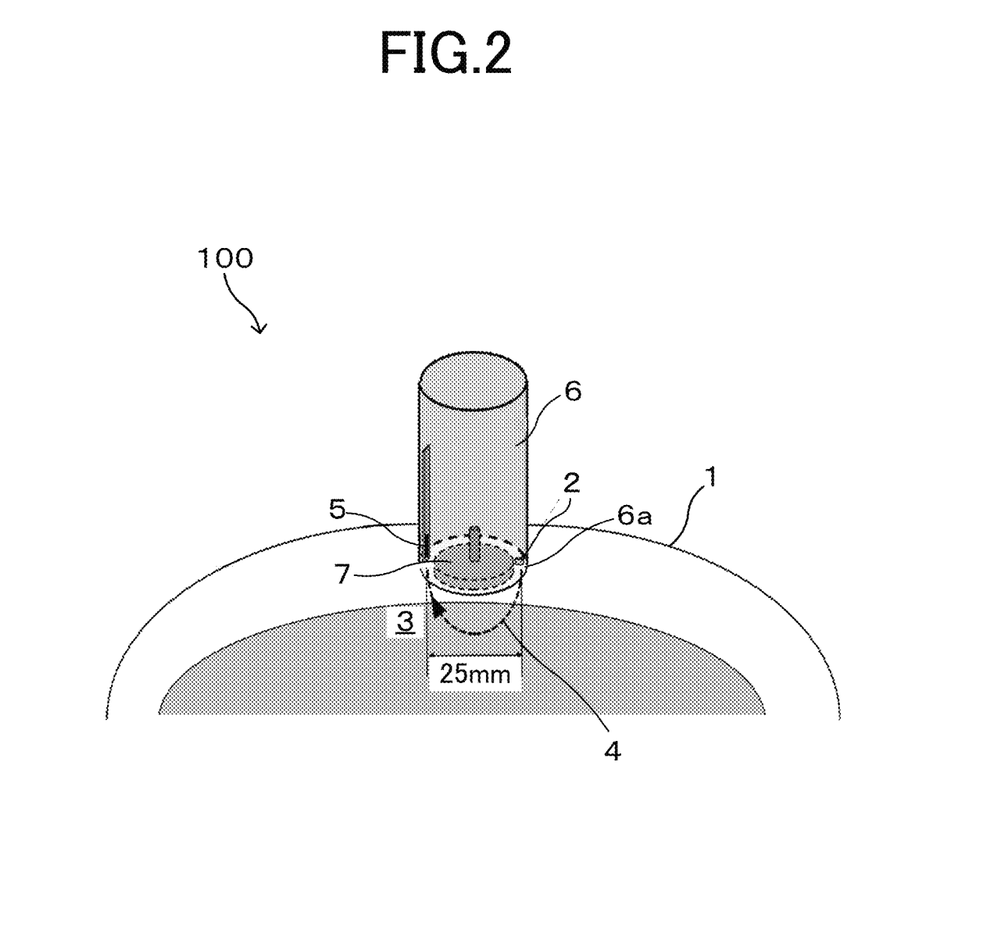
FIG. 2 is a schematic diagram illustrating a configuration of the brain function measurement apparatus including a magnetic shielding container.

The magnetic shielding container 6 is made of a magnetic shielding material except for the bottom face 6a. This is for preventing interference with other magnetic field generating means 2 or a magnetic field present in a measurement environment such as the geomagnetic field. The magnetic field generating means 2 and the magnetic field detecting means 5 are accommodated in the magnetic shielding container 6, and more specifically, disposed adjacent to the bottom face 6a. The bottom face 6a on which the magnetic field generating means 2 and the magnetic field detecting means 5 are disposed is also referred to as a sensing terminal.

To enable radiation of the magnetic field by the magnetic field generating means 2 and detection of the magnetic field by the magnetic field detecting means 5, the bottom face 6a of the magnetic shielding container 6 is made of a material that does not have a magnetic shielding effect. In this manner, by covering the magnetic field generating means 2 and the magnetic field detecting means 5 with the magnetic shielding container 6 that shields an external magnetic field entering from an area other than a portion facing the scalp 1, measurement may be performed with high degree of accuracy while preventing an effect of the external magnetic field that acts as a noise.

To detect the magnetic field 4 that is radiated from the north pole of the magnetic field generating means 2 and passes through the cerebral cortex 3 with the magnetic field detecting means 5, the magnetic field generating means 2 and the magnetic field detecting means 5 need to be disposed a predetermined distance apart from each other. As illustrated in FIG. 2, in the present embodiment, the distance between the magnetic field generating means 2 and the magnetic field detecting means 5 is 25 mm. However, the present disclosure is not limited to this distance. The distance may be any distance that enables the magnetic field that is radiated from the north pole of the magnetic field generating means 2 and passes through the cerebral cortex 3 to be sufficiently detected by the magnetic field detecting means 5, and the distance is not limited to 25 mm.

Figure 3A:
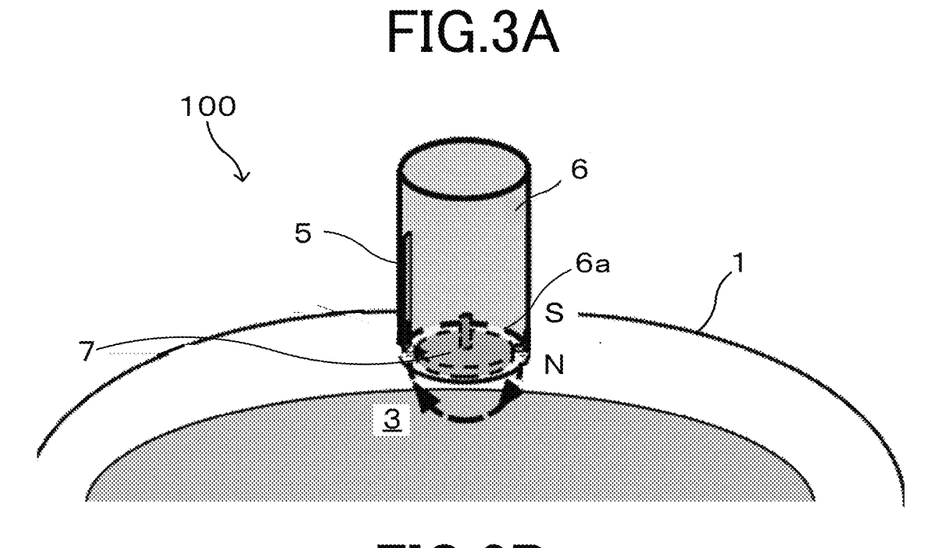
FIG. 3A is a diagram illustrating a concept of measurement in which a polarity of magnetic field generating means is switched and a face in contact with a scalp is set as a north pole.
Figure 3B:
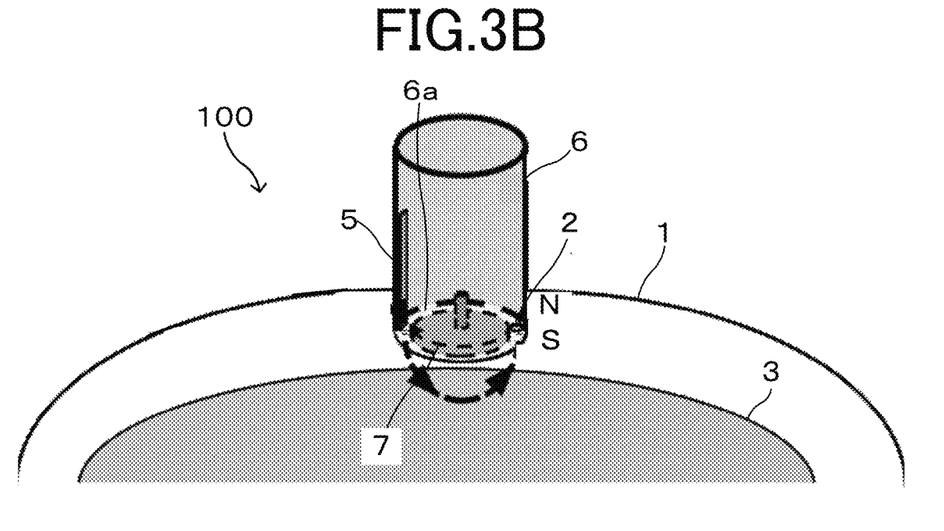
FIG. 3B is a diagram illustrating the concept of measurement in which the polarity of the magnetic field generating means is switched and the face in contact with the scalp is set as a south pole.

FIG. 3A and FIG. 3B illustrate a structure of a sensing terminal 6a in which a polarity of the magnetic field 4 radiated by the magnetic field generating means 2 toward the cerebral cortex 3 is switched. In FIG. 3A, the side in contact with the scalp 1 is the magnetic pole N while in FIG. 3B, the side in contact with the scalp 1 is the magnetic pole S. The interaction between the magnetic field 4 and the cerebral cortex 3 changes in accordance with the relative direction between the magnetic field 4 and the cerebral cortex 3. Therefore, as illustrated in FIG. 3A and FIG. 3B, by changing the direction of the magnetic field as necessary, measurement may be performed in accordance with a direction of an activity of a nerve fiber in the cerebral cortex 3. When an electromagnet (magnet coil) is employed as the magnetic field generating means 2, the north pole and the south pole may be reversed by inverting a direction of current flowing through the magnet coil.

Figure 3C:
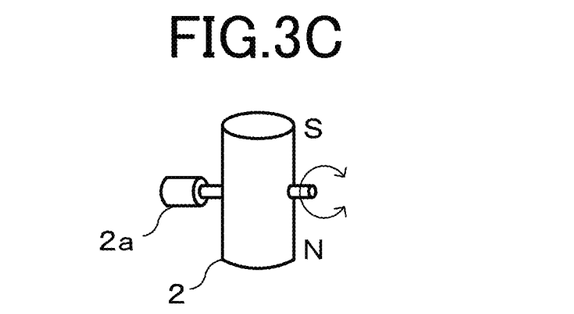
FIG. 3C is a diagram illustrating an example of a structure that enables the polarity of a pole facing a scalp to be freely switchable between a north pole and a south pole.

The magnetic field generating means 2 and the magnetic field detecting means 5 are mounted on the bottom face 6a of the magnetic shielding container 6, and the magnetic field generating means 2 is rotated manually or by rotary drive means 2a such as a motor as illustrated in FIG. 3C. In this manner, the direction of the magnetic field 4 radiated toward the cerebral cortex 3 having a complex structure may be changed. Consequently, while the sensing terminal 6a is still disposed on the scalp 1, the signal to be detected when the relative direction between the magnetic field 4 and the nerve cell is changed may be easily detected by the magnetic field detecting means 5. The magnetic field generating means 2 has a structure that enables a polarity of a pole facing the scalp 1 to be freely switchable between the north pole and the south pole.

Figure 4A:
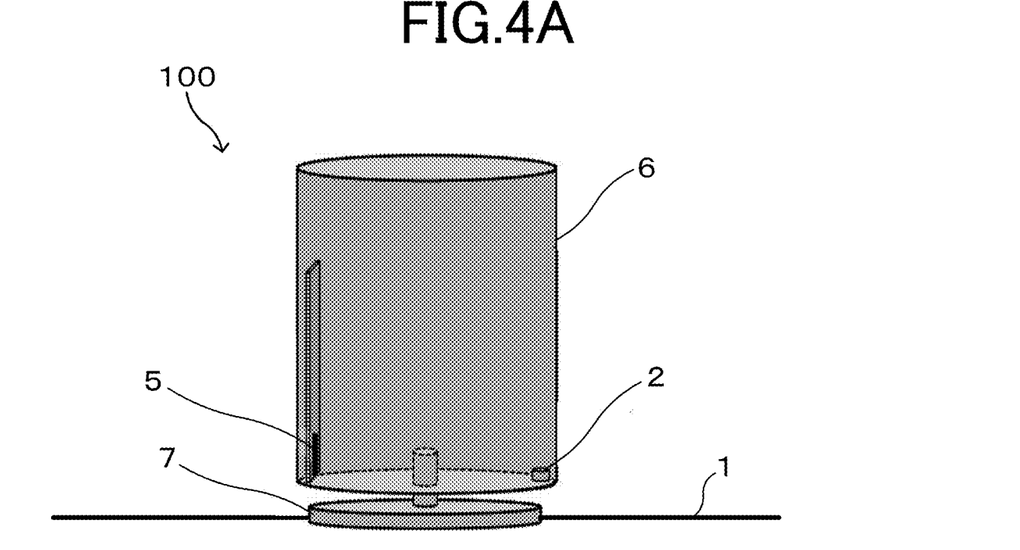
FIG. 4A is a schematic view of an example of a sensing terminal having a free rotation capability.

As illustrated in FIG. 4A, to make the magnetic shielding container 6 rotatable, the magnetic shielding container 6 and the mounting plate 7 are slidable upon each other. Specifically, the mounting plate 7 is provided with a shaft 7a perpendicular to the scalp 1. The shaft is inserted, as illustrate in FIG. 4B, into a through hole 6b formed at the center of the bottom face 6a of the magnetic shielding container 6 that serves as a rotatable member. With this configuration, the magnetic shielding container 6 is rotatably supported around the shaft 7a of the mounting plate 7. The magnetic field generating means 2 and the magnetic field detecting means 5 are attached to an inner side surface of the magnetic shielding container 6. With this configuration, as illustrated in FIG. 4C, the shaft 7a of the mounting plate 7 is at the center of a line connecting the magnetic field generating means 2 and the magnetic field detecting means 5, and by rotating the magnetic shielding container 6 around the shaft, a relative positional relationship between the magnetic field generating means 2 and the magnetic field detecting means 5 may be changed. In other words, the magnetic shielding container 6 serves as a rotatable member to which the magnetic field generating means 2 and the magnetic field detecting means 5 are attached and that is rotatable about the center of the line connecting the magnetic field generating means 2 and the magnetic field detecting means 5 in conjunction with a rotation of the shaft perpendicular to the scalp 1.

Figure 5:
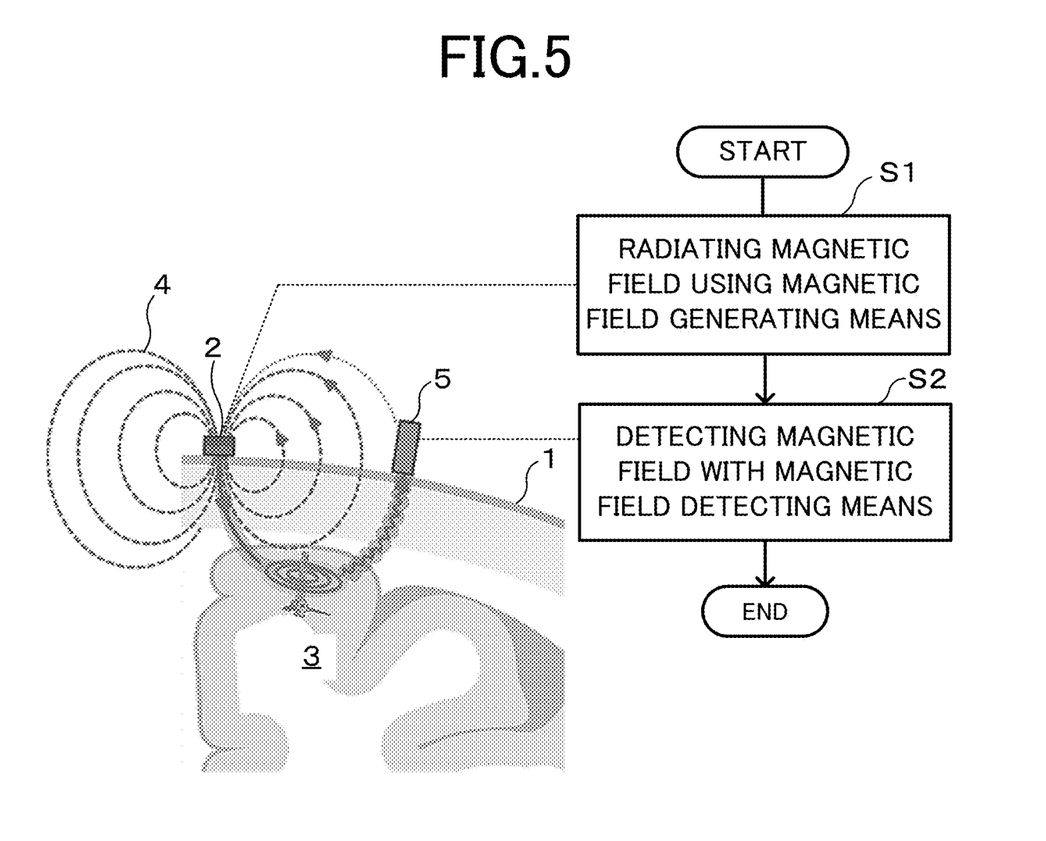
FIG. 5 is a schematic diagram illustrating a flowchart of the brain function measurement method.

Hereinafter, the brain function measurement method for non-invasively measuring a brain function will be described, the method using the brain function measurement apparatus 100 having the configuration described above. First, as illustrated in FIG. 5, the brain function measurement apparatus 100 radiates the magnetic field 4 toward the cerebral cortex 3 at an outermost part of the brain of the subject P using the magnetic field generating means 2 disposed on the scalp 1 of the subject P (step S1). Next, by utilizing a phenomenon that the magnetic field 4 generated by the magnetic field generating means 2 is radiated from the north pole, passes through the cerebral cortex 3 and returns to the south pole in a loop path, the magnetic field that returns as a signal reflecting an activity status of the cerebral cortex 3 is detected by the magnetic field detecting means 5 disposed on the scalp 1 (step S2). The magnetic field detected by the magnetic field detecting means 5 is the signal reflecting the activity status of the cerebral cortex 3.

Figure 4B:
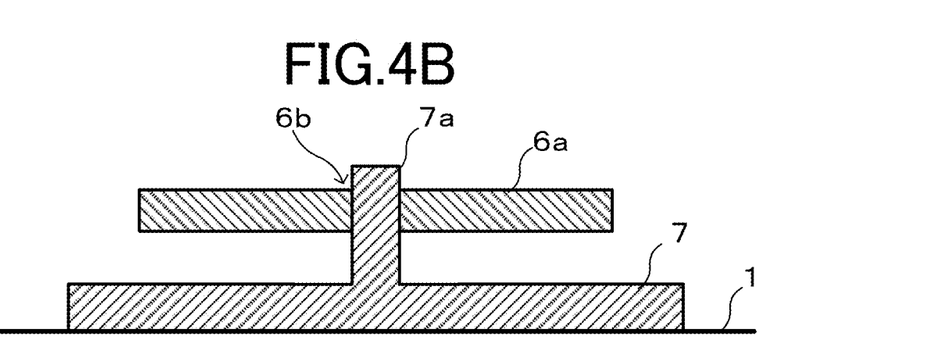
FIG. 4B is a partial cross-sectional view of a mounting plate and a magnetic shielding container.
Figure 4C:
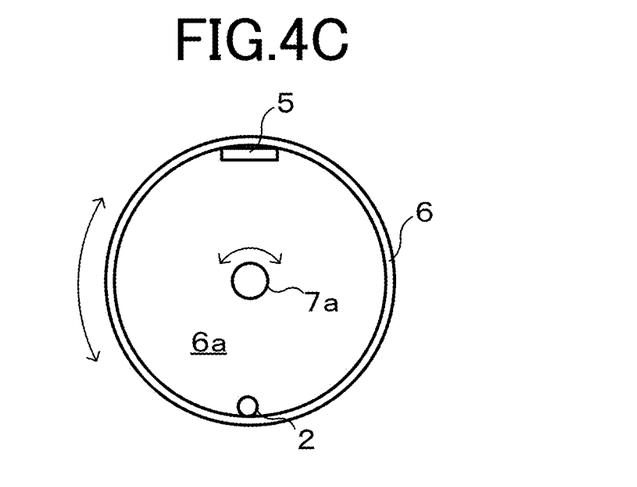
FIG. 4C is a schematic diagram illustrating a positional relationship among components of the brain function measurement apparatus.

As described above, by using the sensing terminal 6a differently as illustrated in FIG. 3A, FIG. 3B, and FIG. 3C and in combination with a rotary mechanism (magnetic shielding container 6) as illustrated in FIG. 4A and FIG. 4B, measurement may be performed in accordance with nerve cells lying in different directions present in the cerebral cortex 3 having a complex structure.

Figure 6A:
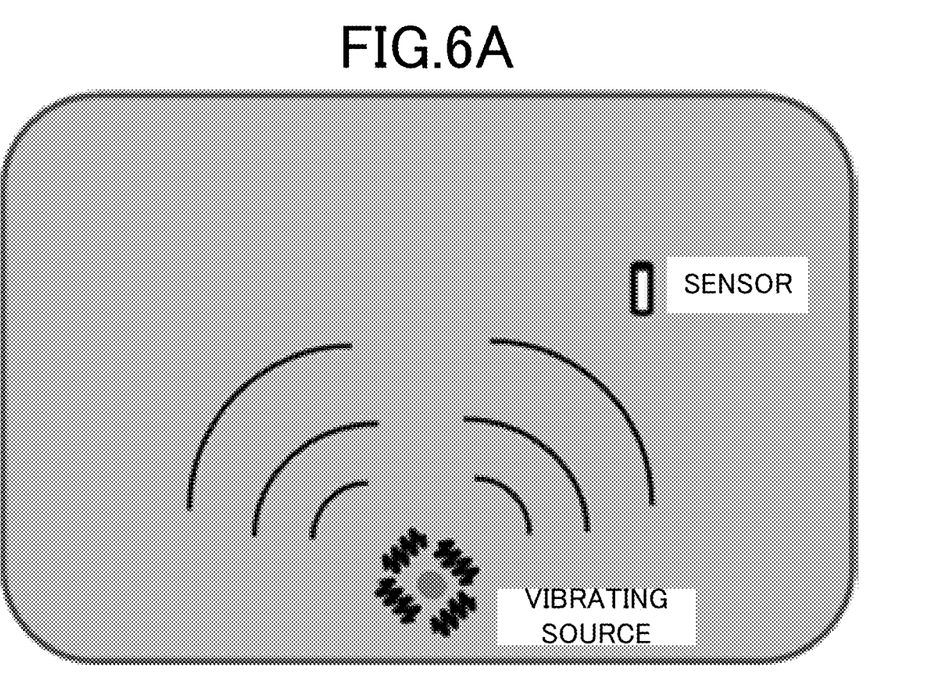
FIG. 6A is a schematic diagram illustrating measurement in a conventional measurement method.
Figure 6B:
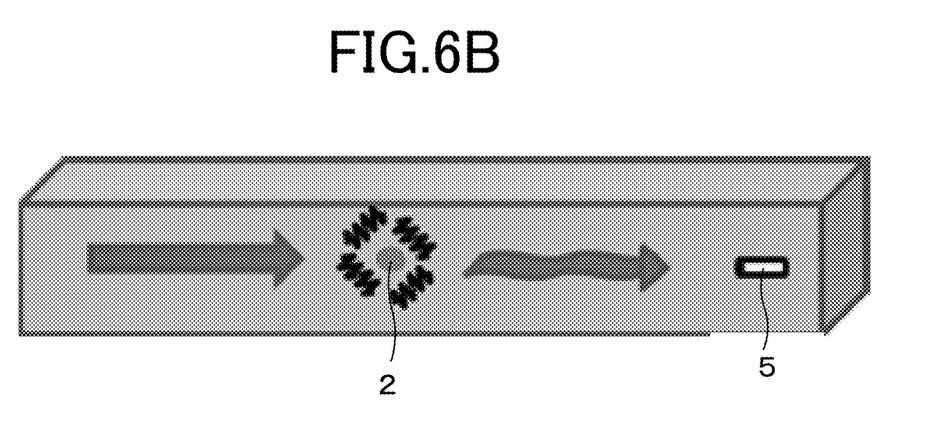
FIG. 6B is a schematic diagram illustrating measurement using the brain function measurement apparatus illustrated in FIG. 1.

Measurement using a conventional sensor for magnetoencephalography is, as illustrated in FIG. 6A, like measuring a vibration (fluctuating magnetic field) that has propagated from a vibrating source (active site in the brain) with a sensor located far away, and the magnitude of a signal to be measured is extremely small. The amplitude of the signal is on the order of a few hundred femto tesla (fT). In contrast, measurement using the method according to the present embodiment is, as illustrated in FIG. 6B, like measuring a steady flow fluctuating due to a vibrating source (active site in the brain) in the middle of a fluid channel (stationary magnetic field) at a downstream position, and the method can measure a relatively large signal. The amplitude of the signal is on the order of 1 to 5 nano tesla (nT).

EXAMPLES

An example of the brain function measurement apparatus 100 and the brain function measurement method according to the present embodiment will be described.

Figure 7:
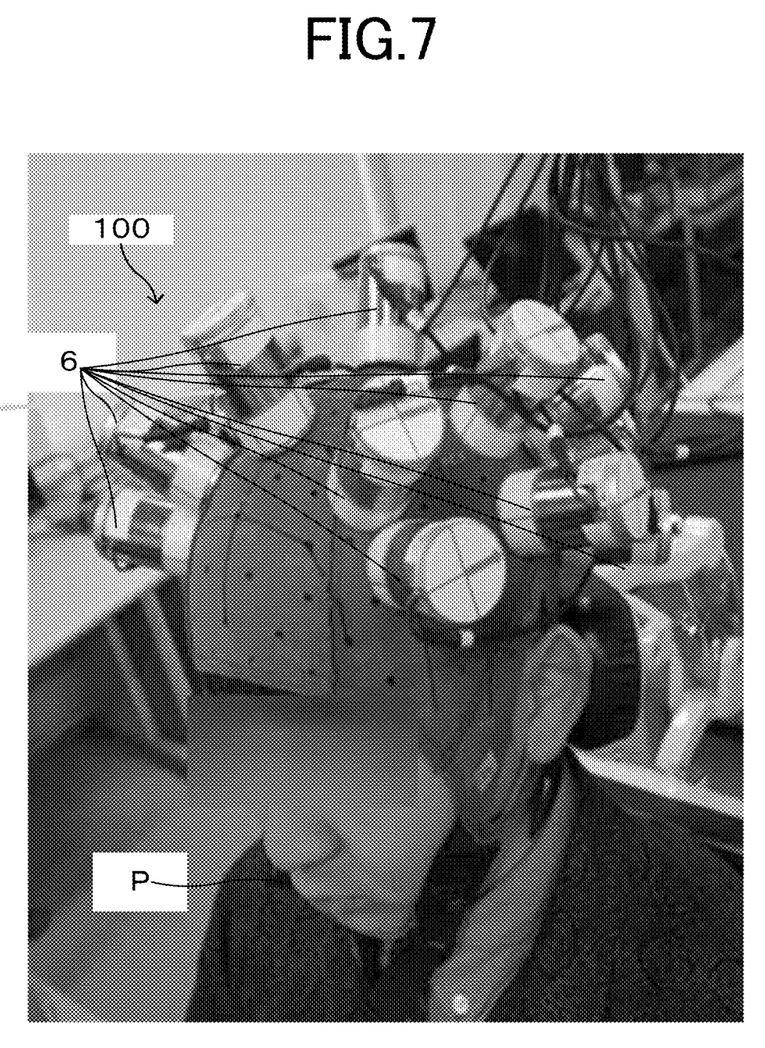
FIG. 7 is a diagram illustrating an example of an exterior appearance of the brain function measurement apparatus.

FIG. 7 illustrates the brain function measurement apparatus 100 attached to a head of the subject P when a signal induced in the cerebral cortex 3 was measured at 16 measurement points, that is, using 16 sets of measurement devices (sensing terminals), in a test in which a median nerve in a right wrist is electrically stimulated. As the magnetic field generating means 2 (see FIG. 1), a ferrite magnet having a diameter of 5 mm and a thickness of 2 mm was used. As the magnetic field detecting means 5 (see FIG. 1), a high-sensitivity sensor "MI-CB-1DH" manufactured by Aichi Micro Intelligent Corporation was used. In addition, the magnetic shielding container 6 was constructed by covering a hollow cylindrical container having a diameter of 30 mm and a height of 51 mm made of polypropylene with a magnetic shielding material "F1AH0607" manufactured by Hitachi Metals, Ltd. having a thickness of 0.12 mm. The bottom face 6a of the magnetic shielding container 6 (hollow cylindrical container made of polypropylene) is not covered by a magnetic shielding material and is open to be opposed to the scalp 1.

The mounting plate 7 (see FIG. 4A) was made of a plastic circular plate having a diameter of 26 mm and a thickness of 2.4 mm. Actually, the magnetic field generating means 2 and the magnetic field detecting means 5 are disposed in the magnetic shielding container 6, spaced 25 mm apart from each other.

During measurement of the signal, electric stimuli were applied to the median nerve by a surface stimulating electrode with a pulse having a width of 500 μs and a strength of 3 mA. With setting intervals between the stimuli to 1.5 s, signals between 100 ms before a stimulus and 1000 ms after the stimulus were measured, 200 pieces of measurement data were added to calculate an average thereof, and a somatosensory evoked signal was obtained.

Figure 8A:
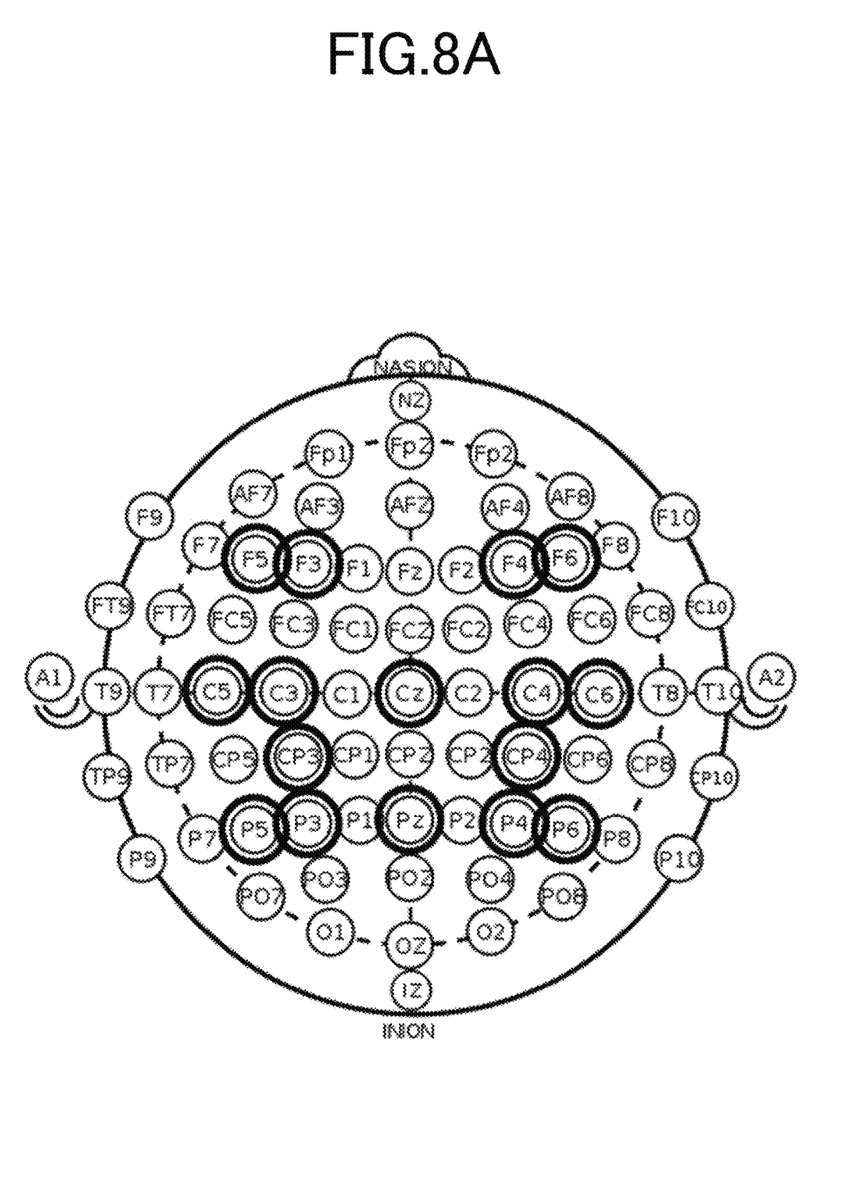
FIG. 8A is a diagram illustrating the brain function measurement method and the result thereof when a median nerve is stimulated in a right wrist, the diagram also illustrating an arrangement of 16 sensing terminals disposed on a scalp.
Figure 8B:
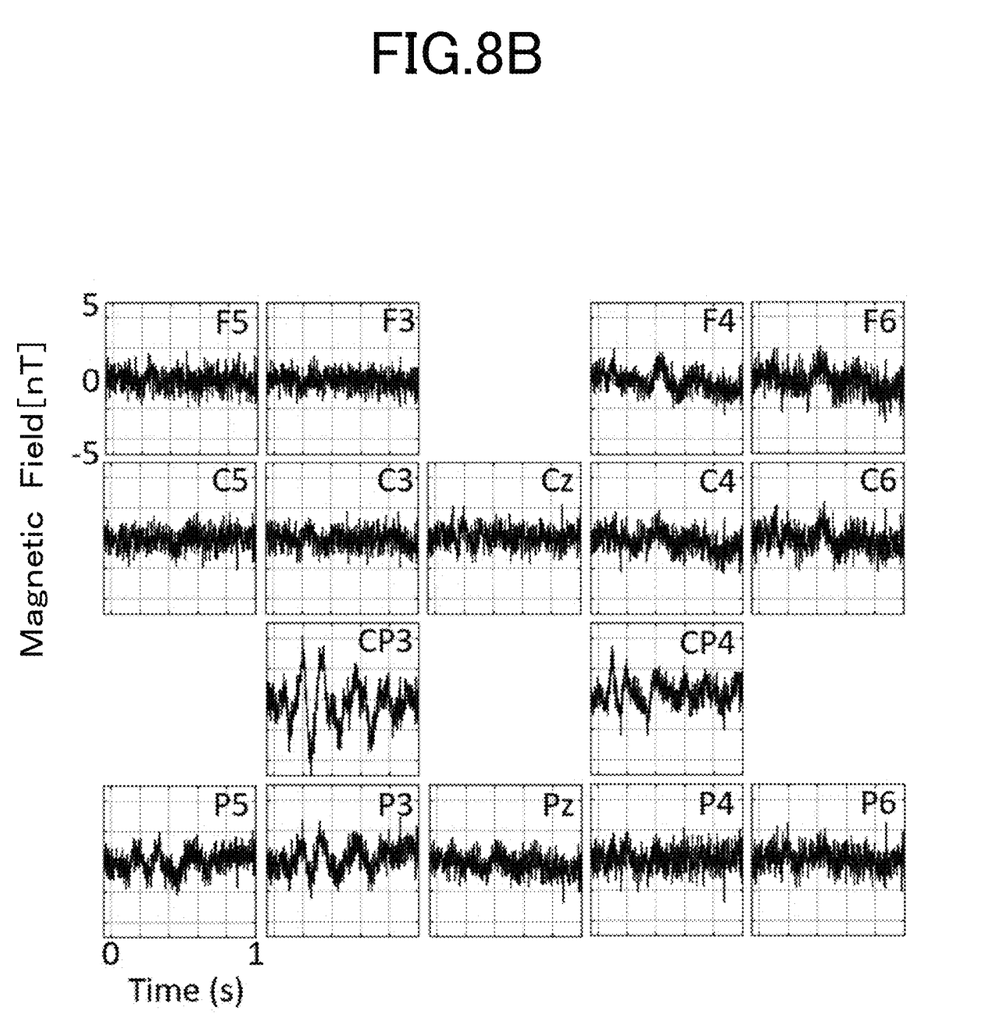
FIG. 8B shows graphs each showing a time-series signal measured with each sensing terminal.

FIG. 8A and FIG. 8B are diagrams showing an outline of the brain function measurement apparatus 100. FIG. 8A illustrates the sites (measurement points) where 16 sets of measurement devices (sensing terminals) were disposed on the scalp 1 of the subject P. FIG. 8B illustrates waveforms of actual time-series signals obtained by the magnetic field detecting means 5 at the sites (measurement points) where the 16 sets of measurement devices (sensing terminals) were disposed. The graphs for measurement results in FIG. 8B, for example, F5, F3, F4, and F6 represent the measurement results at the measurement points F5, F3, F4, and F6 in FIG. 8A, respectively.

The sites (measurement points) where the sets of measurement devices (sensing terminals) were disposed were 16 points according to the electrode arrangement defined in the extended 10-20 International System of Electrode Placement, that is, F3, F4, F5, F6, C3, C4, C5, C6, Cz, CP3, CP4, P3, P4, P5, P6, and Pz. For simplicity, the experiment was performed with setting the directions of the magnetic fields for all channels to the direction from the front part to the rear part of the head.

The site in the cerebral cortex 3 that is activated when a stimulus is applied to the median nerve in the right wrist is the region for hands in the primary somatosensory cortex in the left brain hemisphere, and the position closest to the site among the locations of the extended 10-20 International System of Electrode Placement is CP3. By using the brain function measurement apparatus 100 and the brain function measurement method according to the present example, as illustrated in FIG. 8B, a signal having a large amplitude was observed only for the CP3 site, which validates the effectiveness of the brain function measurement method using the brain function measurement apparatus 100 according to the present embodiment.

Using the brain function measurement apparatus 100 having 16 channels that was produced experimentally, a somatosensory evoked signal was measured. The somatosensory evoked signal evoked by applying an electric stimulus to a median nerve in a left wrist was measured, resulting in confirmation that a large signal was observed locally at an appropriate position (the CP4 position near the region that controls hands in the primary somatosensory cortex in the brain) in the right hemisphere of the head. This result has verified that the brain function measurement method can perform measurement with higher spatial accuracy than conventional brain waves or the magnetoencephalography.

Figure 9:
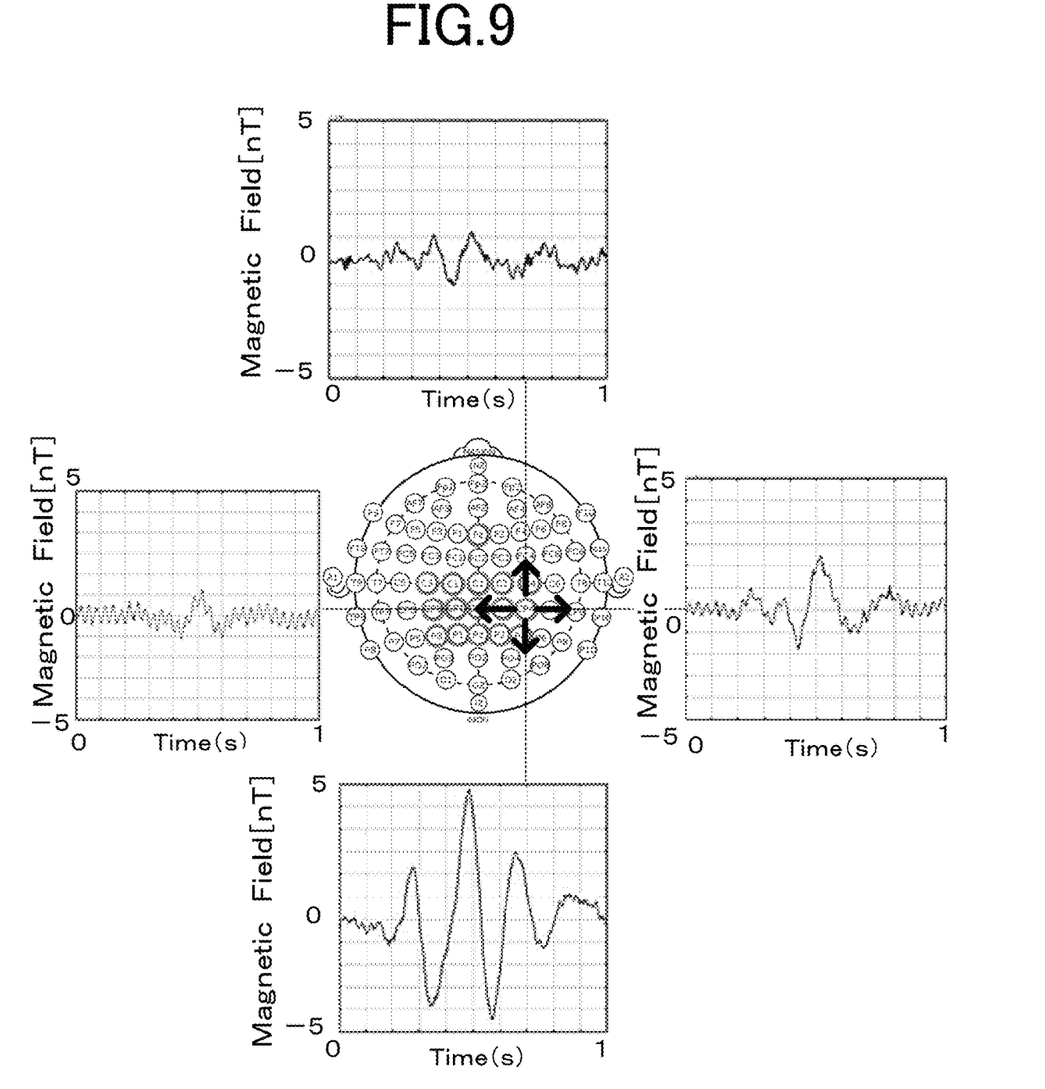
FIG. 9 shows graphs representing a difference among detection results when the direction of a magnetic field is changed.

The direction of the magnetic field (the direction of the magnetic field detecting means 5 viewed from the magnetic field generating means 2) changes widths of signals. For example, as illustrated in FIG. 9, when measurement was performed at the CP4 position with the brain function measurement apparatus 100 according to the present example in directions of four magnetic fields orthogonal to each other with rotating the magnetic shielding container 6, amplitudes of signals changed in accordance with directions of the magnetic fields (the direction of the magnetic field detecting means 5 viewed from the magnetic field generating means 2). The same result was observed at other 15 positions. Thus, measurement of vectorial brain signals including information on the direction of the magnetic field is possible, which is a characteristic that conventional methods do not have.

In the embodiments described above, the north pole or the south pole of the magnetic field generating means 2 was directed to face the scalp 1; however, the present disclosure is not limited to this setting. As long as the magnetic field passes through the cerebral cortex 3, the magnetic field generating means 2 may be mounted without directing the north pole or the south pole to the scalp 1.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-214249, filed on Nov. 15, 2018, the entire disclosure of which is incorporated by reference herein.

INDUSTRIAL APPLICABILITY

According to the present disclosure, with an apparatus having a simple configuration and a simple procedure, an active state of a brain may be measured with high degree of accuracy, and the apparatus and the procedure may be applied to a non-invasive brain function measurement.

REFERENCE SIGNS LIST

1 Scalp
2 Magnetic field generating means

2a Rotary drive means
3 Cerebral cortex
4 Magnetic field (static magnetic field)
5 Magnetic field detecting means
6 Magnetic shielding container
6a Bottom face (sensing terminal)
6b Through hole
7 Mounting plate
7a Shaft
10 Analog/digital converter
11 Device
100 Brain function measurement apparatus
P Subject

The invention claimed is:

1. A brain function measurement apparatus comprising:
magnetic field generating means that is a permanent magnet or an electromagnet, is disposed on a scalp of a subject and generates a static magnetic field which is radiated from a north pole, passing through a cerebral cortex of the subject and returning to a south pole in a loop path; and
magnetic field detecting means disposed on the scalp that detects a fluctuation of the static magnetic field due to an active site in the cerebral cortex in a middle of a path of the static magnetic field, as a signal reflecting an activity status of the cerebral cortex,
wherein the path of the static magnetic field is from the north pole of the magnetic field generating means, the scalp of the subject, the cerebral cortex of the subject, the scalp of the subject, the magnetic field detecting means and to a south pole of the magnetic field generating means in this order.

2. The brain function measurement apparatus according to claim 1, wherein the magnetic field detecting means is one of a uniaxial magnetic field sensor, a biaxial magnetic field sensor, and a triaxial magnetic field sensor.

3. The brain function measurement apparatus according to claim 1, further comprising:
a magnetic shielding container that accommodates the magnetic field generating means and the magnetic field detecting means and shields an external magnetic field entering from an area other than a portion facing the scalp.

4. The brain function measurement apparatus according to claim 1, wherein the brain function measurement apparatus comprises a rotatable member to which the magnetic field generating means and the magnetic field detecting means are attached, the rotatable member being rotatable about the center of a line connecting the magnetic field generating means and the magnetic field detecting means in conjunction with a rotation of a shaft perpendicular to the scalp.

5. The brain function measurement apparatus according to claim 1, wherein the magnetic field generating means includes a structure that enables a polarity of a pole facing the scalp to be switchable between a north pole and a south pole.

6. The brain function measurement apparatus according to claim 1, further comprising:
an analog/digital converter that converts the fluctuation of the static magnetic field, that is detected by the magnetic field detecting means as the signal reflecting the activity status of the cerebral cortex, into time-series digital signal data; and
a device that stores the time-series digital signal data converted by the analog/digital converter.

7. The brain function measurement apparatus according to claim 1, further comprising:
an analog/digital converter that converts the fluctuation of the static magnetic field, that is detected by the magnetic field detecting means as the signal reflecting the activity status of the cerebral cortex, into time-series digital signal data; and
a device that stores and processes and/or calculates the time-series digital signal data converted by the analog/digital converter.

8. The brain function measurement apparatus according to claim 1, wherein the magnetic field generating means and the magnetic field detecting means are disposed on the scalp of the subject such that the path of the static magnetic field includes the magnetic field detecting means.

9. A brain function measurement method for non-invasively measuring a brain function, the brain function measurement method comprising:
radiating, by magnetic field generating means that is a permanent magnet or an electromagnet and is disposed on a scalp of a subject, a static magnetic field toward a cerebral cortex at an outermost part of a brain of the subject; and
allowing the radiated static magnetic field radiated from the magnetic field generating means to pass through the cerebral cortex; and
detecting, by magnetic field detecting means disposed on the scalp, a fluctuation of the static magnetic field due to an active site in the cerebral cortex in a middle of a path of the static magnetic field, as a signal reflecting an activity status of the cerebral cortex,
wherein the path of the static magnetic field is from the north pole of the magnetic field generating means, the scalp of the subject, the cerebral cortex of the subject, the scalp of the subject, the magnetic field detecting means and to a south pole of the magnetic field generating means in this order.

10. The brain function measurement method according to claim 9, wherein the magnetic field detecting means is one of a uniaxial magnetic field sensor, a biaxial magnetic field sensor, and a triaxial magnetic field sensor.

11. The brain function measurement method according to claim 9, wherein a magnetic shielding container that accommodates the magnetic field generating means and the magnetic field detecting means is used to shield an external magnetic field entering from an area other than a portion facing the scalp.

12. The brain function measurement method according to claim 11, wherein the static magnetic field is generated by the magnetic field generating means and detected by the magnetic field detecting means while changing a relationship between a direction toward which the static magnetic field is radiated and a direction of a nerve fiber in the cerebral cortex by rotating a rotatable member to which the magnetic field generating means and the magnetic field detecting means are attached and that includes a shaft perpendicular to the scalp about the center of a line connecting the magnetic field generating means and the magnetic field detecting means.

13. The brain function measurement method according to claim 9, wherein the direction of the static magnetic field radiated toward the cerebral cortex is changed by switching, in the magnetic field generating means, a polarity of a pole facing the scalp between the north pole and the south pole to detect the static magnetic field with the magnetic field detecting means.

14. The brain function measurement method according to claim 9, wherein the static magnetic field is generated by the magnetic field generating means and detected by the magnetic field detecting means while changing a relationship between a direction toward which the static magnetic field is radiated and a direction of a nerve fiber in the cerebral cortex by rotating a rotatable member to which the magnetic field generating means and the magnetic field detecting means are attached and that includes a shaft perpendicular to the scalp about the center of a line connecting the magnetic field generating means and the magnetic field detecting means.

15. The brain function measurement method according to claim 9, further comprising:
converting, by an analog/digital converter, the fluctuation of the static magnetic field, that is detected by the magnetic field detecting means as the signal reflecting the activity status of the cerebral cortex, into time-series digital signal data; and
storing, by a device, the time-series digital signal data converted by the analog/digital converter.

16. The brain function measurement method according to claim 9, further comprising:
converting, by an analog/digital converter, the fluctuation of the static magnetic field, that is detected by the magnetic field detecting means as the signal reflecting the activity status of the cerebral cortex, into time-series digital signal data;
storing, by a device, the time-series digital signal data converted by the analog/digital converter; and
processing and/or calculating, by the device, the time-series digital signal data converted by the analog/digital converter.

17. A brain function measurement apparatus comprising:
magnetic field generating means that is a permanent magnet or an electromagnet and is disposed on a scalp of a subject; and
magnetic field detecting means that is disposed on the scalp,
wherein the magnetic field generating means generates a static magnetic field which is radiated from a north pole in a direction from the magnetic field generating means to a cerebral cortex of the subject, passing through the cerebral cortex of the subject, traveling in a direction from the cerebral cortex of the subject to the magnetic field detecting means, and then returning to a south pole in a loop path, and
the magnetic field detecting means detects a fluctuation of the static magnetic field traveling in the direction from the cerebral cortex of the subject to the magnetic field detecting means after passing through the cerebral cortex of the subject and before returning to the south pole, as a signal reflecting an activity status of the cerebral cortex, the fluctuation of the static magnetic field being caused by an active site in the cerebral cortex in a middle of the static magnetic field.

* * * * *